(12) United States Patent
Morichère-Matte et al.

(10) Patent No.: US 11,010,540 B2
(45) Date of Patent: May 18, 2021

(54) PRODUCTIVITY APPLICATIONS WITH VIEWS OF SOCIAL NETWORK GROUP FEATURES

(71) Applicant: Microsoft Technology Licensing, LLC, Redmond, WA (US)

(72) Inventors: Stéphane Morichère-Matte, Vancouver (CA); Michael Anthony Navarro, Bellevue, WA (US); Om Krishna, Redmond, WA (US); Michael Andrew Griscom, Seattle, WA (US); Vidyaraman Sankaranarayanan, Bellevue, WA (US); Roopesh Kumar Rajamani, Sammamish, WA (US); Darron J. Stepanich, Seattle, WA (US); Peter John Daoud, Westmount (CA); Alvin Ji-Fung Lao, Vancouver (CA); Gregory Iannacone, Burnaby (CA); Ronald Nikolai Bartlett Savas, Vancouver (CA); Grace Lam, Vancouver (CA); Sumanth Pasupuleti, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 351 days.

(21) Appl. No.: 15/190,363

(22) Filed: Jun. 23, 2016

(65) Prior Publication Data

US 2017/0371527 A1    Dec. 28, 2017

(51) Int. Cl.
*G06F 40/166* (2020.01)
*H04L 12/58* (2006.01)
(Continued)

(52) U.S. Cl.
CPC ......... *G06F 40/166* (2020.01); *G06Q 10/107* (2013.01); *G06Q 50/01* (2013.01); *H04L 51/32* (2013.01)

(58) Field of Classification Search
CPC . H04L 12/1827; H04L 51/32; H04L 12/1822; H04L 12/1813; G06Q 50/01;
(Continued)

(56) References Cited

U.S. PATENT DOCUMENTS 6,192,394 B1    2/2001  Gutfreund et al.
8,769,012 B1    7/2014  Shah et al.
(Continued)

FOREIGN PATENT DOCUMENTS

WO    2006028850 A1    3/2006

OTHER PUBLICATIONS

L. Taylor, "Plugin to Huddle with the new Microsoft Office Plugin," published Jul. 21, 2010, downloaded at https://www.huddle.com/blog/plugin-huddle-new-microsoft-office-plugin/ (Year: 2010).*
(Continued)

*Primary Examiner* — Eric J Yoon (57) ABSTRACT

Systems, methods, and software are disclosed herein for enhancing group collaboration in the context of productivity applications. In an implementation, a productivity application includes a user interface in which a document may be presented. In addition, a view of a groups feature provided by a social network service may be presented in the user interface to the productivity application. The view may include various options or interacting with the groups feature, such as the ability to create a new group, the ability to post comments to a group in the social network service, and the ability to upload documents to a group.

20 Claims, 8 Drawing Sheets

(51) Int. Cl.
*G06Q 10/10* (2012.01)
*G06Q 50/00* (2012.01)

(58) Field of Classification Search
CPC ... G06Q 10/107; G06F 3/0482; G06F 30/166;
G06F 9/44526; G06F 2216/15
See application file for complete search history.

(56) References Cited

U.S. PATENT DOCUMENTS

| | | | |
|---|---|---|---|
| 9,104,892 | B2 | 8/2015 | Le Chevalier et al. |
| 9,218,102 | B1* | 12/2015 | Greenspan ............ G06F 3/0481 |
| 9,667,676 | B1* | 5/2017 | Lo ....................... H04L 65/4015 |
| 9,832,237 | B2* | 11/2017 | Lock ...................... H04L 65/403 |
| 2005/0198124 | A1 | 9/2005 | McCarthy |
| 2006/0026502 | A1 | 2/2006 | Dutta |
| 2008/0104173 | A1 | 5/2008 | Wilcox et al. |
| 2011/0252304 | A1* | 10/2011 | Lemonik ................. G06F 40/14 715/234 |
| 2013/0018960 | A1 | 1/2013 | Knysz et al. |
| 2013/0198733 | A1* | 8/2013 | Farrell ................ G06F 9/44526 717/173 |
| 2014/0136943 | A1* | 5/2014 | Palmer .................. G06F 16/986 715/234 |
| 2014/0280566 | A1 | 9/2014 | Chen et al. |
| 2014/0304338 | A1 | 10/2014 | Lee et al. |
| 2015/0113376 | A1 | 4/2015 | Salazar |
| 2015/0134737 | A1 | 5/2015 | Albrecht |
| 2016/0313990 | A1* | 10/2016 | Brown ...................... G06F 8/61 |
| 2019/0215302 | A1* | 7/2019 | Chandramouli ........ H04W 4/70 |

OTHER PUBLICATIONS

"Chat and Real-Time Collaboration", Published on: Sep. 15, 2015 Available at: https://support.google.com/docs/answer/2494891?hl=en.

Weintraub, Seth, "Facebook Docs is no Google Docs", Published on: Apr. 22, 2010 Available at: http://fortune.com/2010/04/22/facebook-docs-is-no-google-docs/.

"Facebook and Google Docs. Better together", Published on: Jun. 29, 2015 Available at: https://zapier.com/zapbook/facebook/google-docs/.

* cited by examiner

PRODUCTIVITY APPLICATIONS WITH VIEWS OF SOCIAL NETWORK GROUP FEATURES

TECHNICAL BACKGROUND

Social network services have become very popular online tools for keeping track of and interacting with friends and colleagues. Users frequently post comments and content that can be consumed by other users in their social network. Some services support a groups feature that allows a group to be created that other users can join. The users in that group may then interact with each other separately from their larger social networks.

Productivity features have been introduced in some social network services that allow users to interact with documents and other productivity items from within the context of their social network services. In other advances, various productivity applications and services support multi-user collaboration on documents in the context of a word processing application, a spreadsheet application, or the like.

From a technical perspective, a great deal of redundancy exists due to the overlapping capabilities of social network services and productivity services. For example, a set of users may be collaborators on a document in the context of a productivity service, while also existing together in a social network group. Thus, separate systems are in place to provide and maintain both the social network group and the collaboration group.

However, it is quite common that not all people in a particular social circle have access to all of the same applications and services. To go around such roadblocks, users may make duplicative efforts, such as emailing or posting the collaborative comments provided in the context of a productivity application to others that lack access to the application. Such efforts waste time and resources and generally inhibit effective group collaboration.

OVERVIEW

Technology is disclosed herein that improves group collaboration in the context of productivity applications. In an implementation, a productivity application includes a user interface in which a document may be presented. In addition, a view of a groups feature provided by a social network service may be presented in the user interface to the productivity application. The view may include various options for interacting with the groups feature, such as the ability to create a new group, the ability to post comments to a group in the social network service, and the ability to upload documents to a group.

The foregoing Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

Enhanced collaboration technology is disclosed herein that allows end-users of productivity applications to interact with the groups features and functionality of social network services. In one exemplary implementation, a productivity application presents a document in a user interface to the application, along with a view of a groups feature. The groups feature, while hosted in a social network service, may be interacted with by way of various options presented in the view. For instance, a user may manage groups through the view, post comments to and consume comments from their groups, and upload documents to a group, all from within the context of a productivity application.

Such an arrangement may provide the technical effect of streamlining group collaboration. A user need not switch back-and-forth between their productivity application and a social networking application, for example, which ultimately conserves device resources and reduces manual effort. In addition, duplicative groups need not be created across productivity platforms and social networking platforms, which conserves the resources required to support both. Rather, users can interact seamlessly with their social network groups through their productivity applications and services.

In some scenarios, the view to a social network's groups feature is provided by an add-in application to a productivity application. The add-in application may communicate with a social network service through a security server. The security server may anchor a user session with the social network service, while the add-in application renders the view within the context of a user interface to the productivity application. This arrangement provides a technical effect of keeping the session secure and stable.

Figure 1:
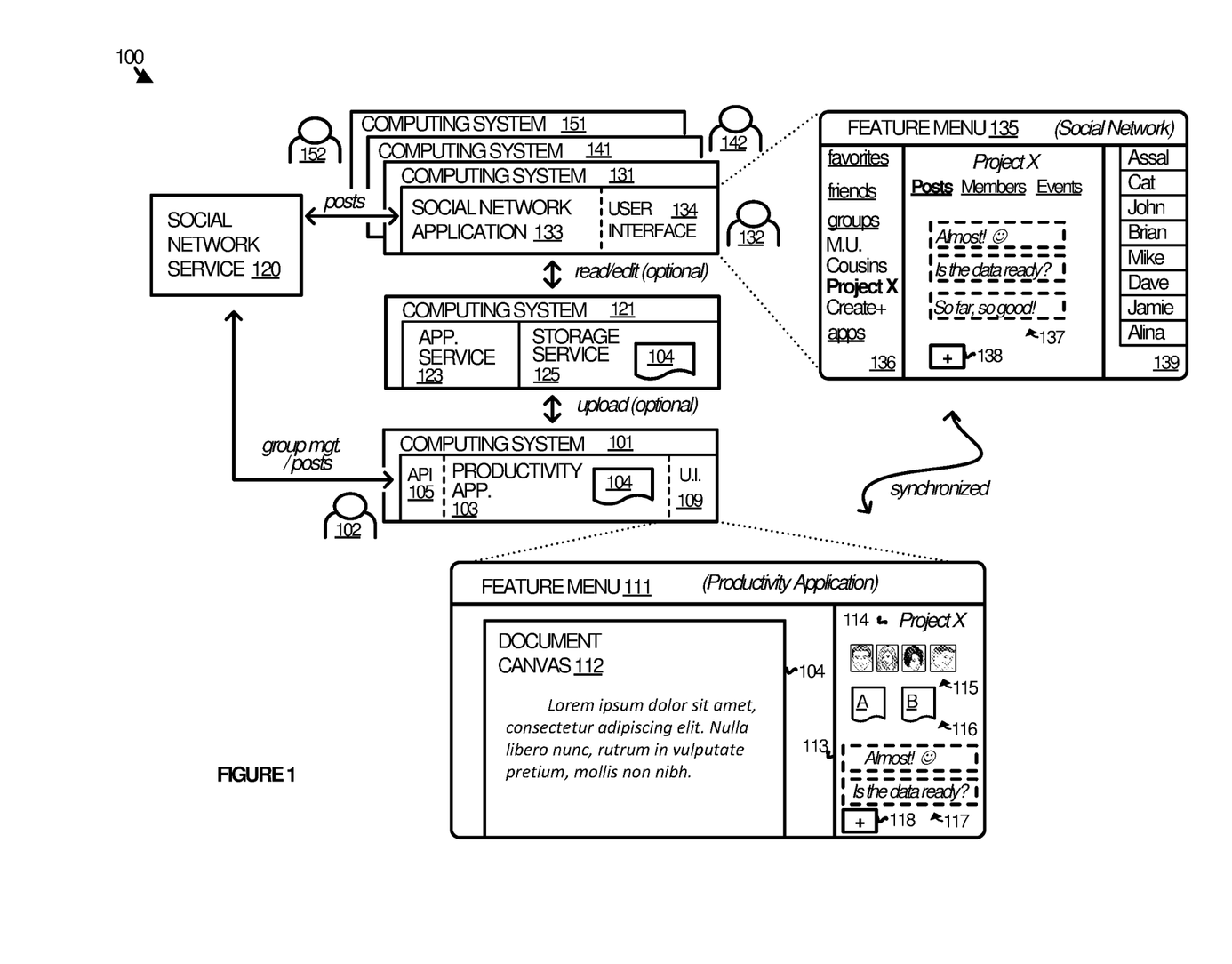
FIG. 1 illustrates an operational architecture in an implementation of enhanced group collaboration in productivity applications.

FIG. 1 illustrates an operational architecture 100 in an implementation. Operational architecture 100 includes computing system 101. Productivity application 103 runs on computing system 101 and includes an API 103 and a user interface 109. API 103 is representative of an application program interface through which computing system 101 may communicate with social network service 120. API 105 may be and add-in application that runs in the context of productivity application 103. In other scenarios, API 105 may be an integrated component of productivity application 103. In still other scenarios, API 105 may be a component of an operating system or some other application on computing system 101.

Social network service 120 is representative of a service or collection of services that provide social networking features and functionality to end-users. Social network service 120 may provide social networking capabilities for end-users and organizations to create profiles, connect with other users, share contents, and keep in touch. Examples include, but are not limited to, Facebook®, Twitter®, and LinkedIn®.

End-users engage with social network service 120 by way of their own computing devices and applications, of which computing system 131, computing system 141, and computing system 151 are representative. As an example, user 132 engages with social network service 120 via computing system 131, while user 142 and user 152 are associated with computing system 141 and computing system 151 respectively. Social network application 133 runs on computing system 131 and provides a user interface 134 to the social network service 120. User 132 may interact with its various features and functionality in user interface 134.

User interface 134 includes a feature menu 135 for accessing controls that correspond to features and functionality of social network service 120. A side panel 136 includes various links to favorites, friends, groups, and apps that may be available to a user on the social network. Side panel 139 includes a list of friends and possibly their status. Other elements in place of or in addition to those shown in user interface 134 are possible and may be considered within the scope of the present disclosure.

Operational architecture 100 also includes computing system 121. Computing system 121 hosts an application service 123 and a storage service 125. Application service 123 is representative of a cloud-based productivity service, such as Office365® and Google® Docs. Storage service 125 is representative of a cloud-based file storage service, such as One Drive®, Google® Drive, Dropbox®, and the like.

Figure 8:
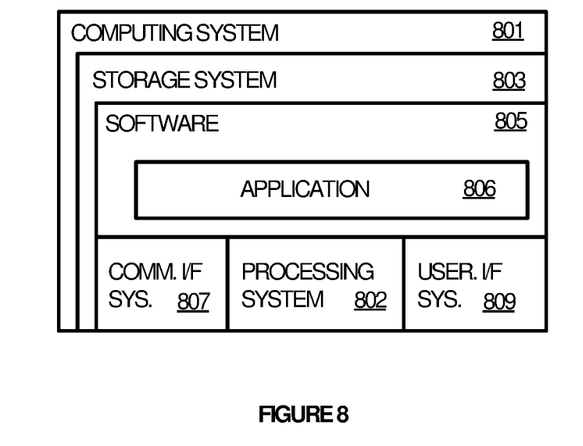
FIG. 8 illustrates a computing system suitable for implementing the enhanced collaboration technology disclosed herein, including any of the applications, architectures, elements, processes, and operational scenarios and sequences illustrated in the Figures and discussed below in the Technical Disclosure.

Computing system 101 is representative of any computing device suitable for employing productivity application 103, API 105, and user interface 109. Examples include desktop and laptop computers, tablets, smart phones, smart televisions, wearable devices (watches, glasses, etc.), and any other type of device, of which computing system 801 in FIG. 8 is representative.

Productivity application 103 is representative of any word processor, spreadsheet application, presentation application, or other similar productivity applications. Productivity application 103 may be a natively installed and executed application, a browser-based application, a mobile application, a streaming or streamed application, or any other type or productivity application, variation, or combination thereof.

Computing system 131, 141, and 151 are representative of any devices suitable for running a social network application, of which computing system 801 is also representative. Social network application 133 is representative of any program application, module, component, or collection thereof capable of interfacing with social network service 120 to provide a user experience with the service. Social network application 133 may be a natively installed application, a browser-based application that runs in the context of a web browser, a mobile application, a streaming or streamed application, or any variation or combination thereof.

In operation, productivity application 103 renders user interface 109 to the application. It is assumed for exemplary purposes that document 104 has been opened in the productivity application 103. Thus, user interface 109 includes document 104, as well as a feature menu 111 of options and capabilities for interacting with the document.

User interface 109 also includes a view 113 of a groups feature supported by social network service 120. A groups feature in the context of a social network service allows a user to associate multiple ones of his or her contacts into a sub-set of contacts. For instance, a user may designate a set of friends as one group, a set of relatives as another group, and so on. The user may then interact with the members of the group exclusively, rather than having communications with the group exposed to the user's larger set of connections.

User may thus join groups that are created by other users or organizations. A user may join an alumni group in a social network that was created by a different user to associate alumni of a particular school, for instance. In an organizational context, a group may be created to associate users having a particular business or other such organization in common. Those users may then interact with each other exclusively within the zone afforded their group by the features and functionality of the social network service.

In particular, view 113 includes various options for interacting with the groups feature of social network service 120. In this example, a group 114 labeled "Project X" is displayed in the view 113 and includes various members 115 (or thumbnail representations), various documents 116 that have been uploaded to the group, comment boxes 117 for posting comments to and consuming comments from the group, and an add button 118 for initiating new comments and other posts.

The options available in view 113 correspond to at least some of the features provided by social network service 120 directly in the user interface 134 to the service rendered on computing system 131. In fact, interactions with the service carried out through user interface 109 (and view 113 in particular) are synchronized with the user experience of other users accessing the service through other channels.

For example, what is posted through comment boxes 117 is surfaced in in the comment boxes 137 in user interface 134. Comments may flow in the opposite direction too, from a view rendered by a social network application to a view rendered by a productivity application (e.g. view 113). A user may create new posts via add button 118, just as a user may add posts via add button 138. Thus, two users may communicate with each other through the groups feature, but one using his or her social networking application while the other is engaged via a productivity application.

A user may in some scenarios wish to upload a document. Using document 104 as an example, the document can be uploaded to storage service 125 (if it doesn't already reside there). Productivity application may then communicate a uniform resource locator (URL) to social network service 120 that links to the location of document 104 in storage service 125. The URL is passed to other users in the group and they can click on the link.

Clicking on the link may direct them to storage service 125 to download the document 104. In some cases, rather than being downloaded, the document 104 may be opened using an application provided by application service 123.

Figure 2:
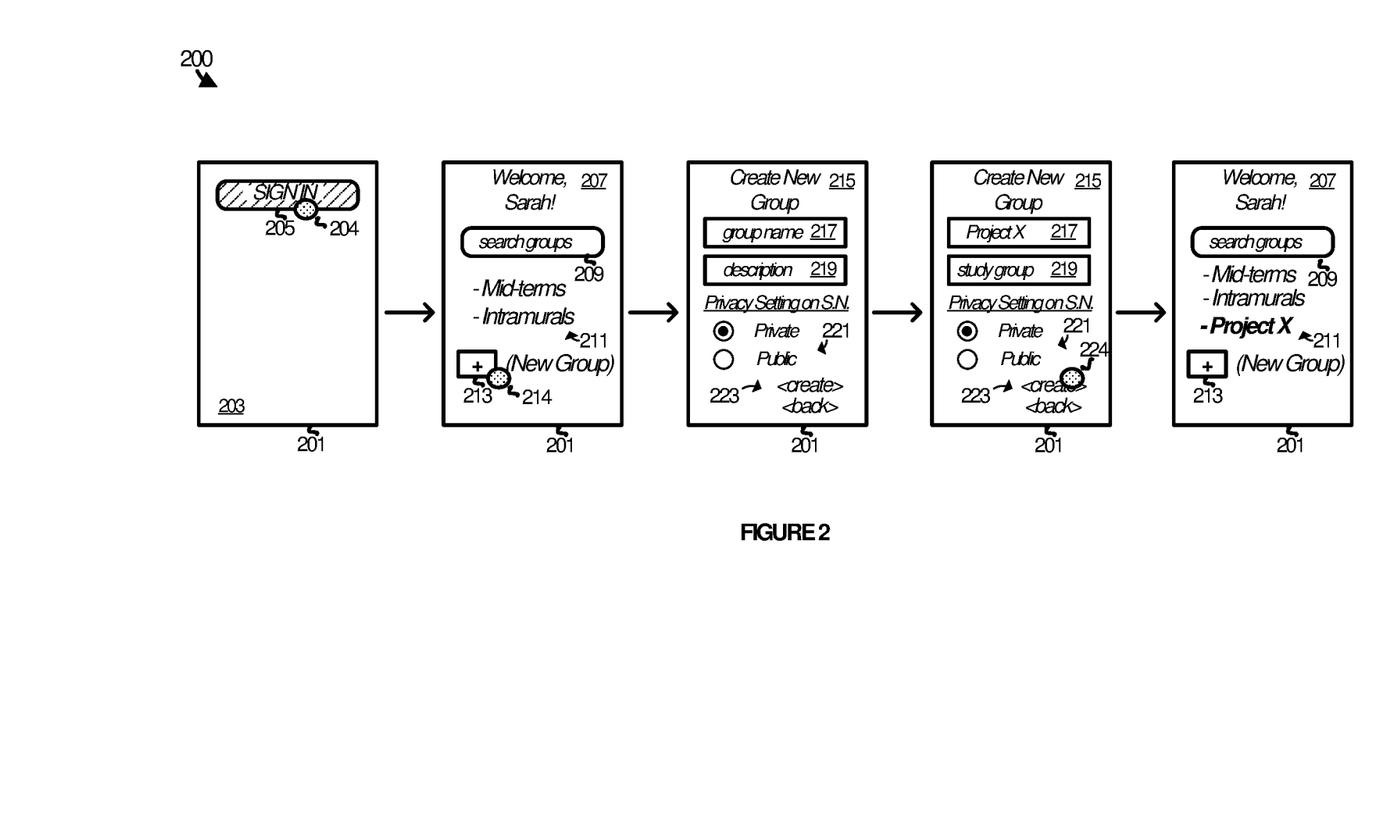
FIG. 2 illustrates an operational scenario in an implementation.

FIG. 2 illustrates an operational scenario 200 in which a user signs into a view 201 to a social network groups feature that is rendered in the context of a productivity application. View 201 initially includes a login page 203. A selection 204 of a sign-in button 205 transitions view 201 to a landing page 207. In some scenarios, an intermediate page between login page 203 and landing page 207 may be surfaced through which the user may input his or her login credentials. In other situations, the login credentials may be saved by the productivity application or some other element.

Landing page 207 includes a search box 209 for searching for groups of interest, as well as a list 211 of existing groups that the user already has already joined. Landing page 207 also includes a new group button 213 that allows the user to create a new group. It may be appreciated that the features and functionality included in landing page 207 may also be available through views rendered by a social networking application. Other options, in addition to or in place of those shown herein are possible and may be considered within the scope of the present disclosure.

Assuming for exemplary purposes that a selection 214 is made of the new group button 213, view 201 transitions to a create new group page 215. This page includes a name box 217 for inputting the name of the new group and a description box 219 for inputting a description of the group. Privacy settings 221 may also be selected in this page, such as whether or not to make the group a private group or a public group. Final options 223 are available allowing the user to either go back a step or to create the group.

In this example, the name of the group is "Project X" and it is described as a study group among school friends. A selection 224 of the create option triggers the group to be created. Returning to the landing page 207 a subsequent time, the list 211 of groups now includes Project X, in addition to Mid-terms and Intramurals.

Other pages may be available in place of or in addition to those shown herein that allow a user to engage with other features and functionality of a social network service, all from within the context of a productivity application. For example, a user could invite users to join a group, remove users to a group, or accept requests by users to join a group. Other options are possible and may be considered within the scope of the present disclosure.

Figure 3:
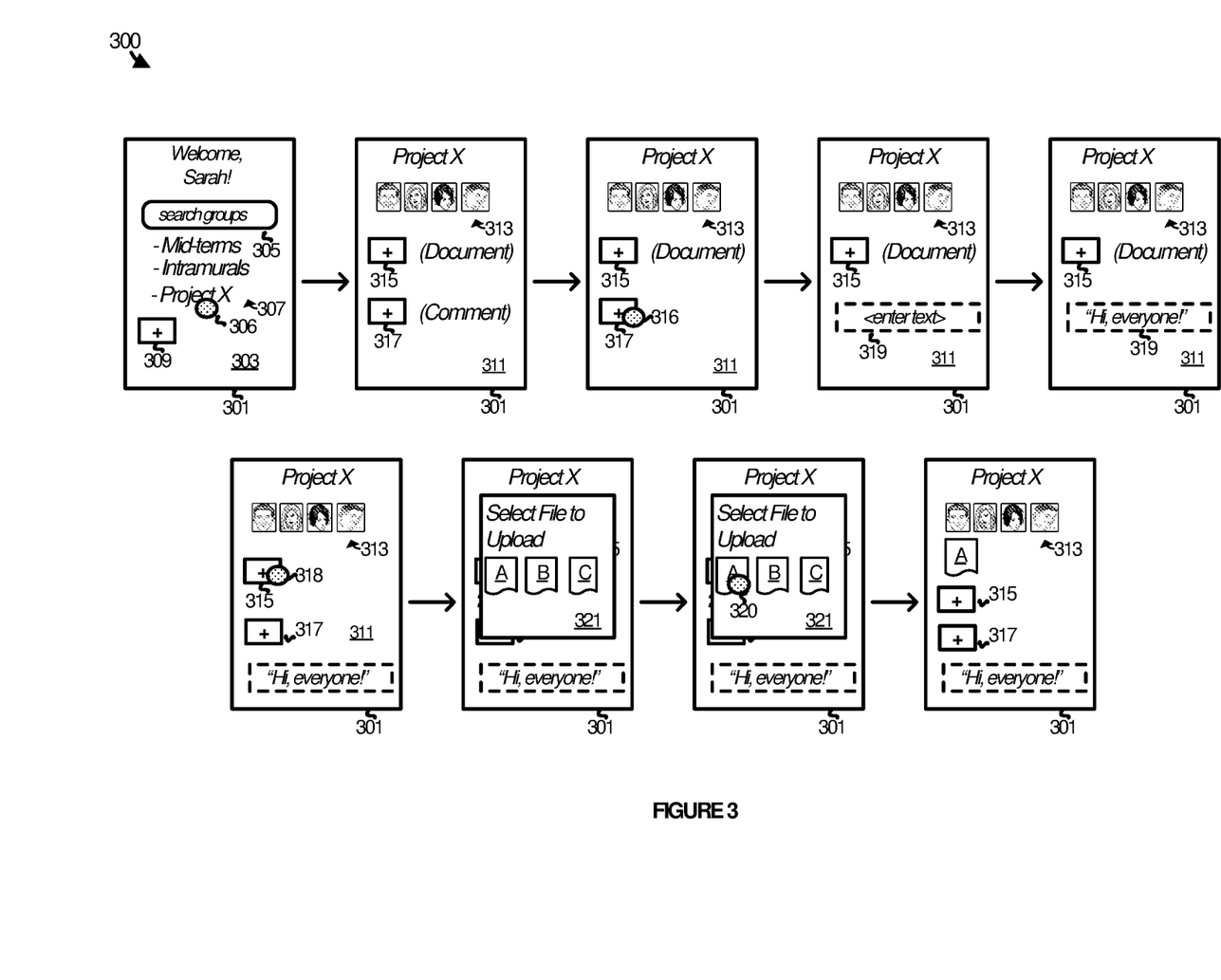
FIG. 3 illustrates an operational scenario in an implementation.

FIG. 3 illustrates another operational scenario 300 in which a user navigates a view 301 to a social network groups feature from within a productivity application, to post comments and upload a document to a group. In operation, a landing page 303 greets the user upon logging to the view. The landing page includes a search box 305 for searching for groups, a list 307 of groups to which the user already belongs, and an add option 309 for adding or creating a new group.

Upon making a selection 306 of one of the groups in the list 307, view 301 transitions from the landing page 303 to a group page 311 for the selected group (Project X). The group page 311 includes thumbnail representations 313 of its members, an upload option 315 for sharing a document with the group, and a comment option 317 for posting a comment to the group. In response to a selection 316 of the comment option 317, group page 311 transitions to include a comment box 319 for inputting text. Next, the user inputs the text string "Hi, everyone." This string is posted as a comment to the group, viewable by members of the groups through their social network application(s).

Continuing with this illustration, the user then proceeds to upload a document to the group. A selection 318 is made of the upload option 315 and group page 311 transitions to include an upload menu 321 surfaced over the main perspective of the page. The upload menu 321 includes thumbnail representations of various documents (A, B, and C) that the user can select to upload to the group. It is assumed for exemplary purposes that document A is selected. Accordingly, a thumbnail representation of the document appears in the main perspective of the group page 311. In addition, a link, thumbnail representation, or some other related element would be surfaced in the view of the group provided by a social networking application so that the other members of the group may access it.

Figure 4:
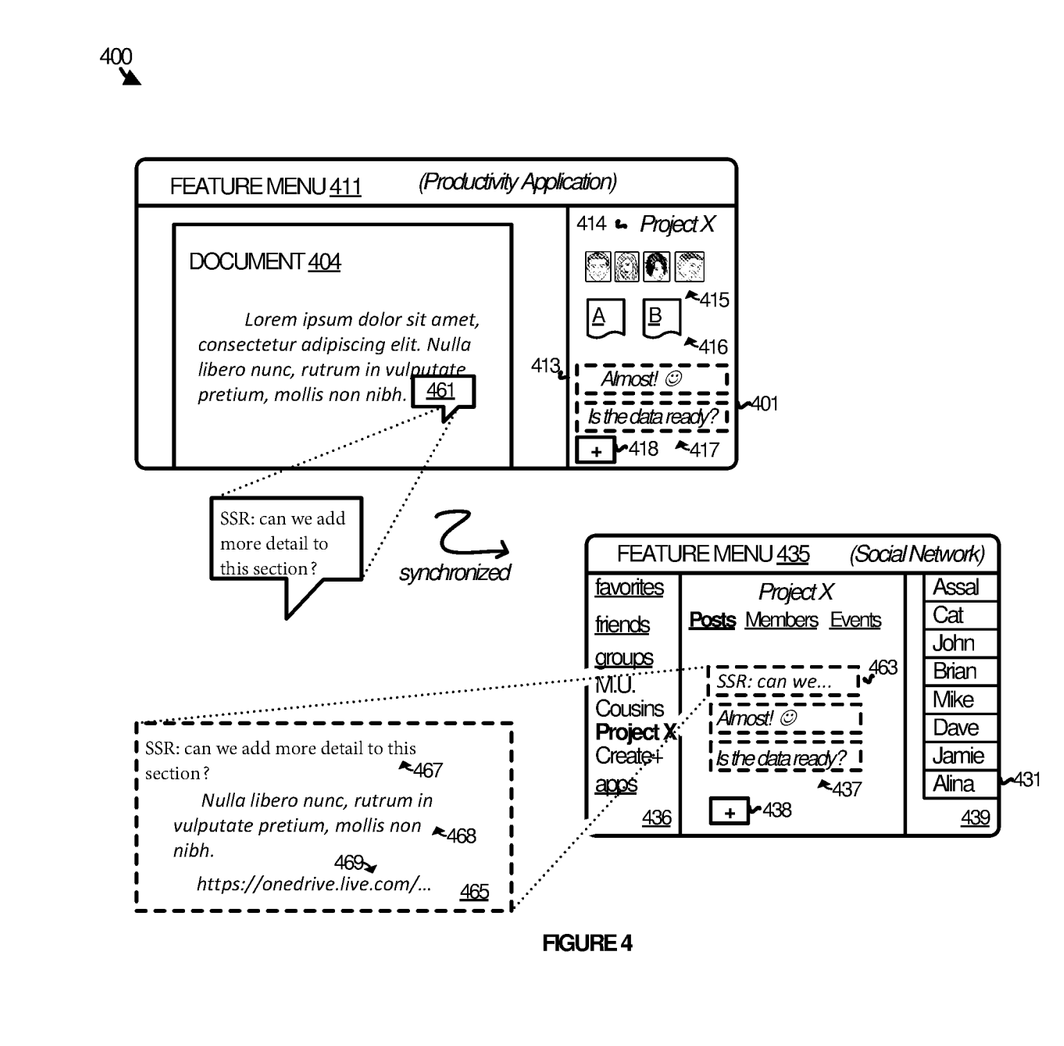
FIG. 4 illustrates an operational scenario in an implementation.

FIG. 4 illustrations an operational scenario 400 in an implementation whereby editing comments made in the context of editing a document may be communicated to a group in a social network. In operational scenario 400, a user interface 401 to a productivity application is presented. The user interface 401 includes a feature menu 411, a document 404, and a view 413 of a groups feature. The groups feature is provided by a social network service to allow users to participate in groups in a social network.

View 413 includes various details of a representative group and options for interacting with the group. A title 414 identifies a group (Project X) in this example, while thumbnails 415 represent members of the group. Thumbnail representations 416 of two documents (A and B) exemplify documents that may have been shared with the group. Comment boxes 417 are available in the view 413 for posting comments to and consuming comments from the group. An add option 418 provides a mechanism for a user to post a new comment, a new document, or the like.

A user working on document 404 may input an editing comment 461. An editing comment is a comment that is input using editing tools of a productivity application. The editing comment is embedded in document 404, but can be posted to the comments section of a group in a social network.

User interface 431 is representative of a view that may be provided in a social networking application of a group in a user's social network. User interface 431 includes a feature menu 435, as well as a side panel 436 and a side panel 439. In the center, group details are provided for a group selected from side panel 436 (Project X). The group details include, for example, sub-sections for viewing group posts, members of the group, and group events. In the posts sub-section, comment boxes 437 are available for consuming comments and an add option 438 is available for creating new comments.

In this scenario, the comments include a comment 463 that corresponds to the editing comment 461 made via the productivity application. In an expanded form 465, the comment 463 includes the original text of editing comment 461 (i.e., expanded comment 467), as well as text from document 404 that the editing comment 461 was associated with (i.e., expanded text 468). The expanded form 465 of comment 463 also includes a link 469 to document 404 in a cloud-based storage system. Thus, a user interacting with a user interface 431 to a social networking service is able to consume posts derived from editing comments made via a productivity application. In addition, the posts may be annotated with related sections from a document and a link to the document itself.

Figure 5:
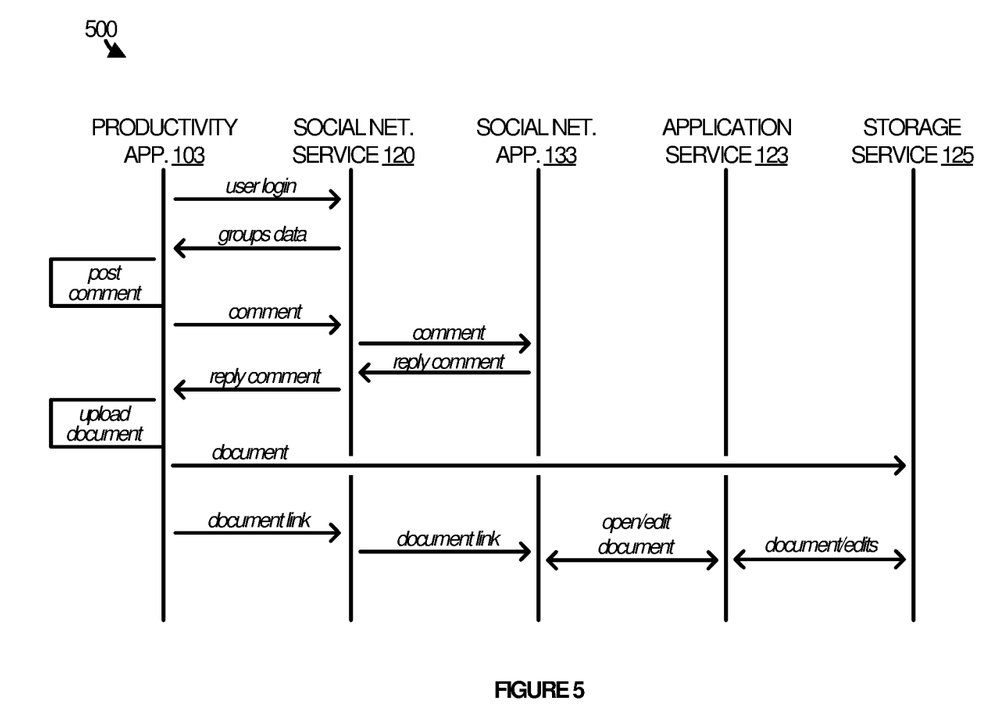
FIG. 5 illustrates an operational sequence in an implementation.

FIG. 5 illustrates an operational sequence 500 in an implementation related to operational architecture 100 in FIG. 1. In operation, a user logs-in to social network service 120 through productivity application 103, an add-in application to productivity application 103, or through some other local channel on computing system 101. Social network service 120 replies to the login with groups data associated with the user's account in the social network service.

The user may desire to post a comment to a group. The user inputs text or other information though a view to the group provided locally. The comment is communicated by productivity application 103 to social network service 120. Social network service 120 then distributes the comment to other users in the group, through their respective social networking application (e.g. social network application 133). One or more of those users may provide a comment in reply, which is communicate to productivity application 103 through social network service 120.

The user may also desire to upload a document. Navigating a view to the groups feature provided by productivity application 103, the document is first uploaded to storage service 125. In parallel, productivity application 103 communicates a link to the document to social network service 120. Social network service 120 surfaces the link in one or more of the social networking applications used by the other members of the group. The document may be opened via the link using an application provided by application service 123 (or by a native application, if available). Edits, comments, or other changes can be saved to the document in storage service 125.

Figure 6:
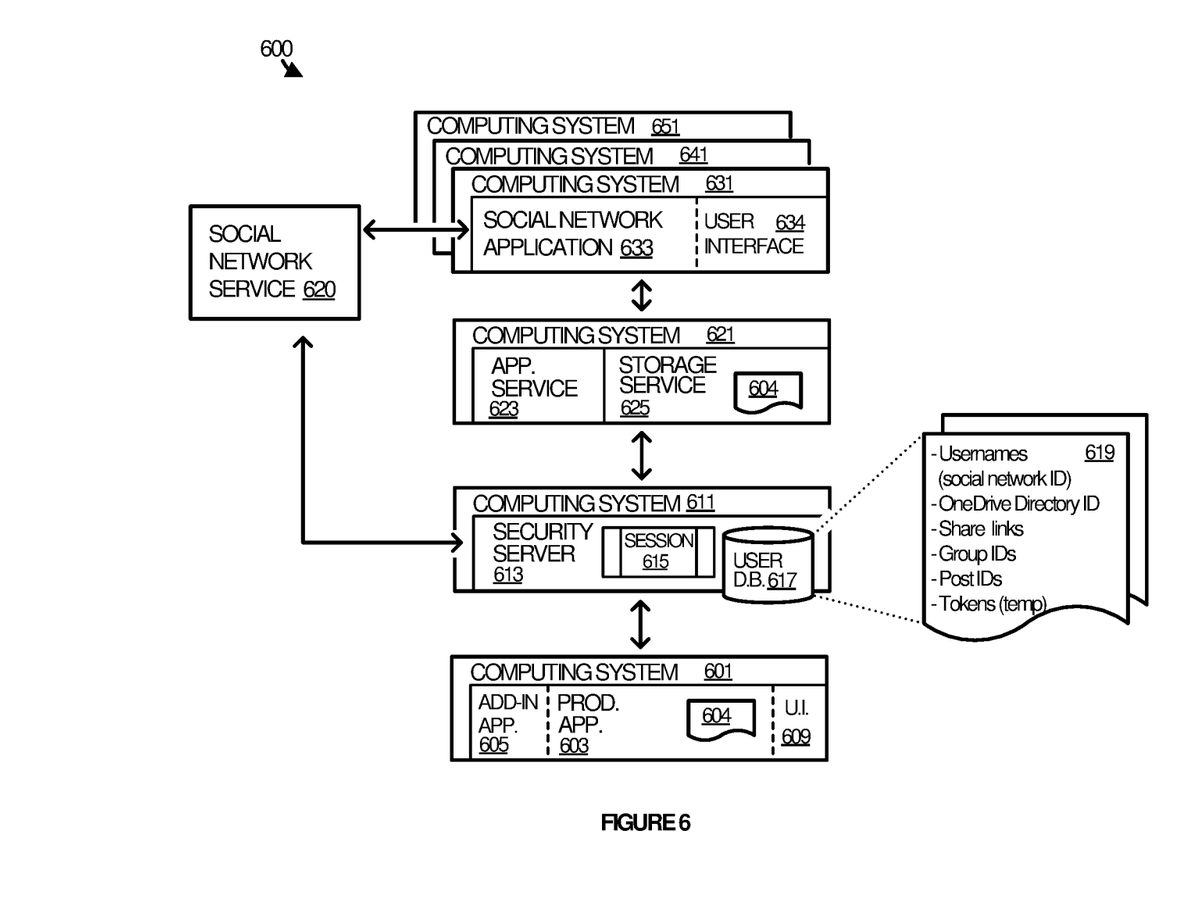
FIG. 6 illustrates an operational architecture in an implementation of enhanced group collaboration in productivity applications.

FIG. 6 illustrates an operational architecture 600 in an implementation. Operational architecture 600 includes computing system 601, computing system 611, computing system 621, and computing systems 631, 641, and 651.

Productivity application 603 runs on computing system 601, as does add-in application 605. Productivity application 603 includes a user interface 609 to the application in which add-in application 605 may present a view to a groups feature provided by social network service 620.

Add-in application 605 communicates with security server 613 on computing system 611 to facilitate user access to the group features. Security server 613 anchors service sessions for users in order to maintain secure correspondence between the social network service 620, productivity application 603, add-in application 605, application service 623, and storage service 625. Session 615 is representative of one such session.

User database 617 stores user information for logging into and maintaining the sessions with social network service 620, as well as for facilitating access to application service 623 and storage service 625. A record 619 in user database 617 may include, for example, the identity of a user on the social network, a user identity for a user in the storage service 625 (e.g. a One Drive directory ID), share links, group identities, post identifiers, and tokens for accessing any of the aforementioned services.

Application service 623 and storage service 625 allow documents to be uploaded and shared with members of a social network group. The other members may utilize social networking applications to interact with social network service 620. For example, social network application 633 running on computing system 631 provides a user interface 634 to social network service 620. Computing systems 641 and 651 may provide similar applications and user interfaces.

Figure 7:
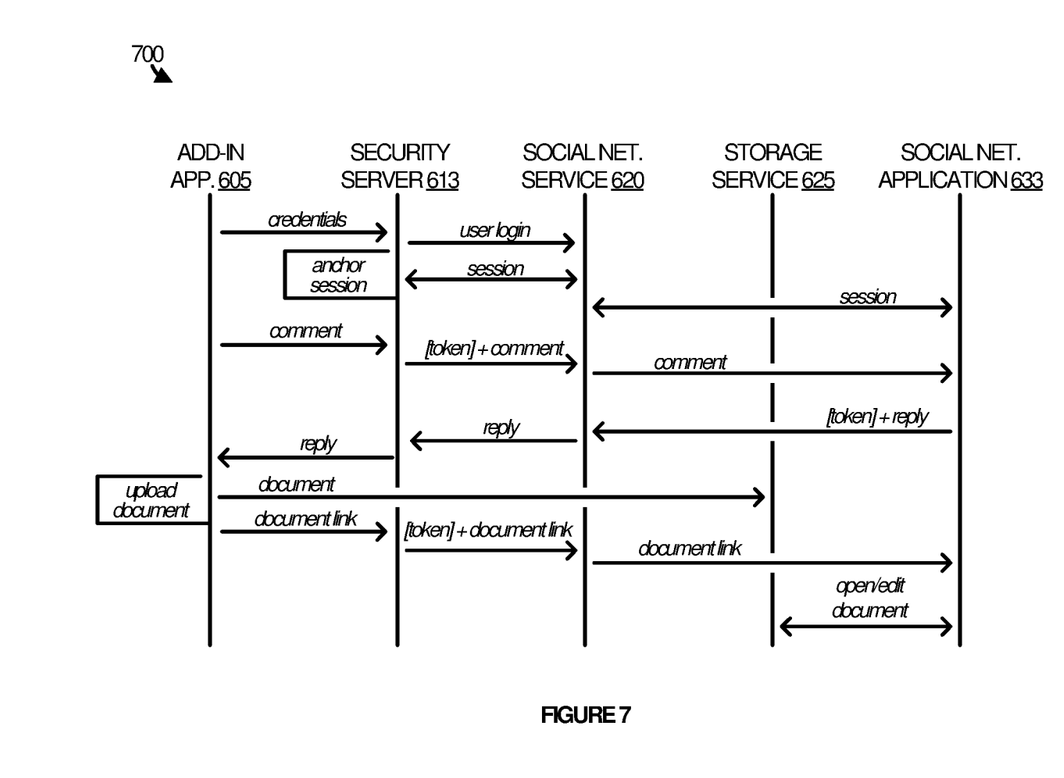
FIG. 7 illustrates an operational sequence in an implementation.

FIG. 7 illustrates an operational sequence 700 that relates to an implementation of operational architecture 600. In operation, add-in application 605 supplies credentials to security server 613 (e.g. a username and password for social network service 620). Security server 613 logs-in the user to social network service 620. Thus, a service session is established between social network service 620 and security server 613 on behalf of the user engaged with add-in application 605.

In the meantime, other users in a social network group may be active in a session with the network. For example, a session is established between social network service 620 and social network application 633. Users in the group may wish to post comments to their group. When the user associated with add-in application 605 posts a comment, add-in application 605 communicates the comment to security server 613. Security server 613 then communicates the comment with a token to social network service 620. Social network service 620 posts the comment to the group which can be viewed by the user interface rendered by social network application 633.

Similarly, when the user associated with social network application 633 inputs a reply comment, social network application 633 supplies the comment with a token to social network service 620. Social network service 620 communicates the reply to other social network applications, but also to security server 613 since it anchors a session with add-in application 605. Security server 613 communicates the reply to add-in application 605 to surface in its user interface.

When a document is uploaded to the group, add-in application 605 uploads the document to storage service 635. A link to the document is communicated to security server 613, which notes the location of the document in user database 617. Security server 613 supplies the link and a token to social network service 620 so that the document may be opened by other members of the group. For example, social network application 633 can obtain the link from a post in social network service 620. The link can be used to open the document from storage service 625, possibly using application service 623.

FIG. 8 illustrates computing system 801, which is representative of any system or collection of systems in which the various applications, services, scenarios, and processes disclosed herein may be implemented. Examples of computing system 801 include, but are not limited to, desktop computers, laptop computers, tablet computers, computers having hybrid form-factors, mobile phones, smart televisions, wearable devices, server computers, blade servers, rack servers, and any other type of computing system (or collection thereof) suitable for carrying out the enhanced collaboration operations described herein. Such systems may employ one or more virtual machines, containers, or any other type of virtual computing resource in the context of supporting enhanced group collaboration.

Computing system 801 may be implemented as a single apparatus, system, or device or may be implemented in a distributed manner as multiple apparatuses, systems, or devices. Computing system 801 includes, but is not limited to, processing system 802, storage system 803, software 805, communication interface system 807, and user interface system 809. Processing system 802 is operatively coupled with storage system 803, communication interface system 807, and user interface system 809.

Processing system 802 loads and executes software 805 from storage system 803. Software 805 includes application 806 which is representative of the productivity applications and add-in applications discussed with respect to the preceding FIGS. 1-7, including productivity application 103 and add-in application 605. When executed by processing system 802 to enhance group collaboration, application 806 directs processing system 802 to operate as described herein for at least the various processes, operational scenarios, and sequences discussed in the foregoing implementations. Computing system 801 may optionally include additional devices, features, or functionality not discussed for purposes of brevity.

Referring still to FIG. 8, processing system 802 may comprise a micro-processor and other circuitry that retrieves and executes software 805 from storage system 803. Processing system 802 may be implemented within a single processing device, but may also be distributed across multiple processing devices or sub-systems that cooperate in executing program instructions. Examples of processing system 802 include general purpose central processing units, application specific processors, and logic devices, as well as any other type of processing device, combinations, or variations thereof.

Storage system 803 may comprise any computer readable storage media readable by processing system 802 and capable of storing software 805. Storage system 803 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 803 may also include computer readable communication media over which at least some of software 805 may be communicated internally or externally. Storage system 803 may be implemented as a single storage device, but may also be implemented across multiple storage devices or sub-systems co-located or distributed relative to each other. Storage system 803 may comprise additional elements, such as a controller, capable of communicating with processing system 802 or possibly other systems.

Software 805 in general, and application 806 in particular, may be implemented in program instructions and among other functions may, when executed by processing system 802, direct processing system 802 to operate as described with respect to the various operational scenarios, sequences, and processes illustrated herein. For example, application 806 may include program instructions for implementing a view of social network groups and features in a productivity application.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 805 may include additional processes, programs, or components, such as operating system software, virtual machine software, or other application software, in addition to or that include application 806. Software 805 may also comprise firmware or some other form of machine-readable processing instructions executable by processing system 802.

In general, application 806 may, when loaded into processing system 802 and executed, transform a suitable apparatus, system, or device (of which computing system 801 is representative) overall from a general-purpose computing system into a special-purpose computing system customized to enhance entity classification operations. Indeed, encoding application 806 on storage system 803 may transform the physical structure of storage system 803. The specific transformation of the physical structure may depend on various factors in different implementations of this description. Examples of such factors may include, but are not limited to, the technology used to implement the storage media of storage system 803 and whether the computer-storage media are characterized as primary or secondary storage, as well as other factors.

For example, if the computer readable storage media are implemented as semiconductor-based memory, application 806 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 807 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 809 may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 809. In some cases, the input and output devices may be combined in a single device, such as a display capable of displaying images and receiving touch gestures. The aforementioned user input and output devices are well known in the art and need not be discussed at length here.

User interface system 809 may also include associated user interface software executable by processing system 802 in support of the various user input and output devices discussed above. Separately or in conjunction with each other and other hardware and software elements, the user interface software and user interface devices may support a graphical user interface, a natural user interface, or any other type of user interface, in which a user interface to a productivity application may be presented.

Communication between computing system 801 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. In any of the aforementioned examples in which data, content, or any other type of information is exchanged, the exchange of information may occur in accordance with any of a variety of well-known data transfer protocols.

Certain inventive aspects may be appreciated from the foregoing disclosure, of which the following are various examples.

EXAMPLE 1

A computing apparatus comprising: one or more computer readable storage media; a processing system operatively coupled with the one or more computer readable storage media; and a productivity application stored on the one or more computer readable storage media and comprising program instructions that, when executed by the processing system, direct the processing system to at least: present a document in a user interface to the productivity application; present a view in the user interface of a groups feature in a social network; and present options in the view for interacting with the groups feature through the user interface to the productivity application.

EXAMPLE 2

The computing apparatus of Example 1 wherein the options for interacting with the groups feature comprise a create option for creating a group in the social network through the user interface to the productivity application.

EXAMPLE 3

The computing apparatus of Examples 1-2 wherein the options for interacting with the groups feature further comprise a post option for posting comments to the group in the social network through the user interface to the productivity application.

EXAMPLE 4

The computing apparatus of Examples 1-3 wherein the options for interacting with the groups feature further comprise a message option for messaging members of the group in the social network through the user interface to the productivity application.

EXAMPLE 5

The computing apparatus of Examples 1-4 wherein the options for interacting with the groups feature further comprise an upload option for uploading the document to the group in the social network through the user interface to the productivity application.

EXAMPLE 6

The computing apparatus of Examples 1-5 wherein the document comprises a local version of the document and wherein, in response to the upload option being invoked, the program instructions direct the processing system to create a remote version of the document and deprecate the local version of the document.

EXAMPLE 7

The computing apparatus of Examples 1-6 wherein the program instructions further direct the processing system to synchronize comments between the view and the group.

EXAMPLE 8

The computing apparatus of Examples 1-7 wherein the program instructions further direct the processing system to post editing comments made in the document to the group.

EXAMPLE 9

A method of operating a productivity application, the method comprising: presenting a document in a user interface to the productivity application; presenting a view in the user interface of a groups feature in a social network; and presenting options in the view for interacting with the groups feature through the user interface to the productivity application.

EXAMPLE 10

The method of Example 9 wherein the options for interacting with the groups feature comprise a create option for creating a group in the social network through the user interface to the productivity application.

EXAMPLE 11

The method of Examples 9-10 wherein the options for interacting with the groups feature further comprise a post option for posting comments to the group in the social network through the user interface to the productivity application.

EXAMPLE 12

The method of Examples 9-11 wherein the options for interacting with the groups feature further comprise a message option for messaging members of the group in the social network through the user interface to the productivity application.

EXAMPLE 13

The method of Examples 9-12 wherein the options for interacting with the groups feature further comprise an upload option for uploading the document to the group in the social network through the user interface to the productivity application.

EXAMPLE 14

The method of Examples 9-13 wherein the document comprises a local version of the document and wherein the method further comprises, in response to the upload option being invoked, creating a remote version of the document and deprecating the local version of the document.

EXAMPLE 15

The method of Examples 9-14 further comprising synchronizing comments between the view and the group.

EXAMPLE 16

The method of Examples 9-15 further comprising posting editing comments made in the document to the group.

EXAMPLE 17

One or more computer readable storage media; and a productivity application stored on the one or more computer readable storage media and comprising program instructions that, when executed by a processing system, direct the processing system to at least: present a document in a user interface to the productivity application; present a view in the user interface of a groups feature in a social network; and present options in the view for interacting with the groups feature through the user interface to the productivity application.

EXAMPLE 18

The one or more computer readable storage media of Example 17 wherein the options for interacting with the groups feature comprise: a create option for creating a group in the social network through the user interface to the productivity application; a post option for posting comments to the group in the social network through the user interface to the productivity application; a message option for messaging members of the group in the social network through the user interface to the productivity application; and an upload option for uploading the document to the group in the social network through the user interface to the productivity application.

EXAMPLE 19

The one or more computer readable storage media of Examples 17-18 wherein the document comprises a local version of the document and wherein, in response to the upload option being invoked, the program instructions direct the processing system to create a remote version of the document and deprecate the local version of the document.

EXAMPLE 20

The one or more computer readable storage media of Examples 17-19 wherein the program instructions further direct the processing system to synchronize comments between the view and the group and to post editing comments made in the document to the group.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

The invention claimed is:

1. A computing system comprising:
one or more computer readable storage media;
a processing system in communication with the one or more computer readable storage media; and
program instructions, stored on the one or more computer readable storage media, for conducting a session on behalf of a user engaged with a social network service via an add-in to a productivity application, wherein the program instructions, when executed by the processing system, direct the processing system to at least:
via the add-in, supply credentials to a security server to establish the session between the social network service and the security server on behalf of the user;
in the add-in, present a view of a group of a plurality of users, wherein the group is associated with the user through the social network service, and wherein the view is presented in a context of a user interface of the productivity application;
via the productivity application and without assistance from the add-in, display a document;
receive, at the document and from the user, an editing comment associated with the document;
in the add-in, send comments to the security server, wherein the comments include the editing comment and a portion of the document associated with the editing comment; and
in the security server, communicating the comments with a security token to the social network service for the comments to be surfaced in other views of the group.

2. The computing system of claim 1 wherein the program instructions further direct the processing system to:
monitor for the editing comment to be created in the document.

3. The computing system of claim 1 wherein the program instructions further direct the processing system to send a link for the document to the social network service to be surfaced in the other views of the group.

4. The computing system of claim 1 wherein the view of the group comprises a thumbnail for at least a productivity document.

5. The computing system of claim 1 wherein the program instructions further direct the processing system to present options for interacting with the group.

6. The computing system of claim 5 wherein the options for interacting with the group comprise an upload option for uploading the document to the social network service, wherein the document comprises a local version of the document, and wherein, in response to the upload option being invoked, the program instructions direct the processing system to create a remote version of the document and deprecate the local version of the document.

7. The computing system of claim 5 wherein the options for interacting with the group comprise a create option for creating a new group in the social network service through the user interface.

8. The computing system of claim 1 wherein the program instructions further direct the processing system to synchronize comments between the view of the group and a group page hosted by the social network service.

9. A method of conducting a session on behalf of a user engaged with a social network service via an add-in to a productivity application, the method comprising:
via the add-in, supplying credentials to a security server to establish the session between the social network service and the security server on behalf of the user;
in the add-in, presenting a view of a group of a plurality of users, wherein the group is associated with the user through the social network service, and wherein the view is presented in a context of a user interface of the productivity application;
via the productivity application and without assistance from the add-in, displaying a document;
receiving, at the document and from the user, an editing comment associated with the document;
in the add-in, sending comments to the security server, wherein the comments include the editing comment and a portion of the document associated with the editing comment; and
in the security server, communicating the comments with a security token to the social network service for the comments to be surfaced in other views of the group.

10. The method of claim 9 further comprising:
monitoring for the editing comment to be created in the document.

11. The method of claim 9 further comprising sending a link for the document to the social network service to be surfaced in the other views of the group.

12. The method of claim 9 wherein the view of the group comprises a thumbnail for at least a productivity document.

13. The method of claim 9 wherein the method further comprises presenting options for interacting with the group.

14. The method of claim 13 wherein the options for interacting with the group comprise an upload option for uploading the document to the social network service, wherein the document comprises a local version of the document, and wherein the method further comprises, in response to the upload option being invoked, creating a remote version of the document and deprecating the local version of the document.

15. The method of claim 13 wherein the options for interacting with the group comprise a create option for creating a new group in the social network service through the user interface.

16. The method of claim 9 further comprising synchronizing comments between the view of the group and a group page hosted by the social network service.

17. One or more computer readable storage media having program instructions stored thereon, wherein the program instructions conduct a session on behalf of a user engaged with a social network service via an add-in to a productivity application and, when executed by a processing system, direct the processing system to at least:
via the add-in, supply credentials to a security server to establish the session between the social network service and the security server on behalf of the user;
in the add-in, present a view of a group of a plurality of users, wherein the group is associated with the user through the social network service, and wherein the view is presented in a context of a user interface of the productivity application;
via the productivity application and without assistance from the add-in, display a document;
receive, at the document and from the user, an editing comment associated with the document;
in the add-in, send comments to the security server, wherein the comments include the editing comment and a portion of the document associated with the editing comment; and
in the security server, communicating the comments with a security token to the social network service for the comments to be surfaced in other views of the group.

18. The one or more computer readable storage media of claim 17 wherein the program instructions further direct the processing system to present options for interacting with the group, the options comprising:
a post option for posting comments to the group in the social network service through the user interface to the productivity application;
a message option for messaging members of the group in the social network service through the user interface to the productivity application; and
an upload option for uploading the document to the group in the social network service through the user interface to the productivity application.

19. The one or more computer readable storage media of claim 18 wherein the document comprises a local version of the document and wherein, in response to the upload option being invoked, the program instructions direct the processing system to create a remote version of the document and deprecate the local version of the document.

20. The one or more computer readable storage media of claim 18 wherein the program instructions further direct the processing system to:
synchronize comments between the view and the group;
identify a portion of text from the document that is associated with the editing comment; and
send the portion of text to the social network service to be surfaced in the other views of the group.

* * * * *